United States Patent Office 2,739,675
Patented Mar. 27, 1956

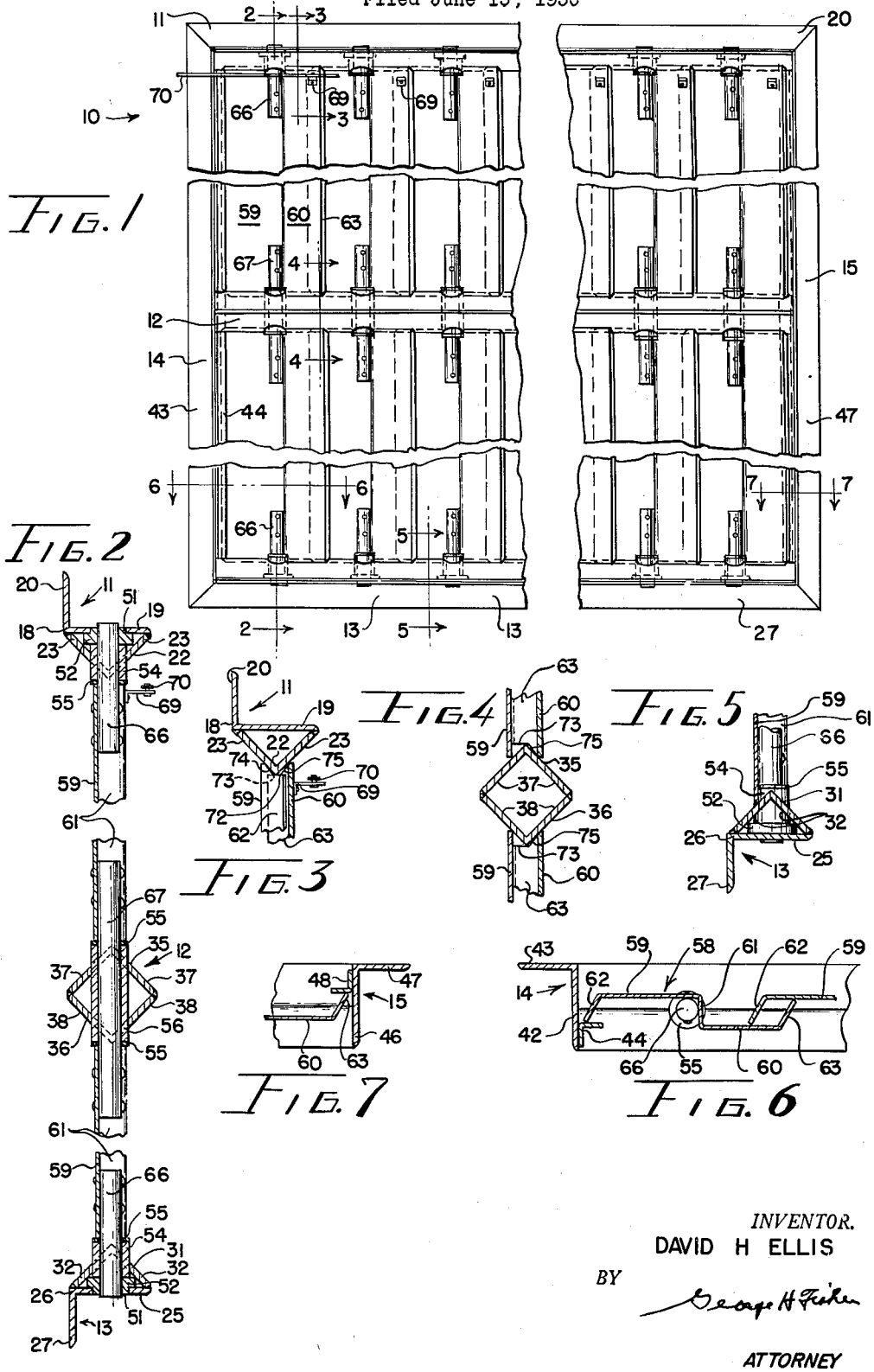

2,739,675

SHUTTER CONSTRUCTION

David H. Ellis, Oak Park, Ill., assignor to Minneapolis-Honeywell Regulator Company, Minneapolis, Minn., a corporation of Delaware Application June 15, 1950, Serial No. 168,311

10 Claims. (Cl. 189—62)

This invention relates to an improved heavy duty shutter construction adapted for exposure to weather conditions. Shutters exposed to outside weather conditions, such as those used for cooling control on Diesel locomotives, if made to close reasonably tight against air leakage, generally give trouble during icing conditions because the sealing edges tend to freeze together. Further, where packing is used for improving the seal, it tends to freeze to the shutter blades and is then damaged when the blades are moved. The problem of making a shutter that avoids the above difficulty and yet can be sold on a competitive market is further complicated by the large number of moving parts that must fit accurately, which accuracy must be maintained under adverse conditions of weather, vibration and loading and with a minimum of maintenance.

It is thus an object of this invention to provide an improved shutter having blade and frame members arranged to provide adequate sealing without packing or flexible sealing strips.

It is a further object to provide a shutter construction having frame members arranged to minimize icing and permitting water to run off readily and wherein only a minimum of ice must be broken, if icing should occur, to permit operation of the blades.

It is also an object to provide a shutter wherein self-oiling bushings are held in place by the frame members themselves, thereby eliminating the need for separate bearing attachment means.

It is an additional object to provide an improved shutter blade construction having great stiffness and good sealing characteristics.

These and other objects will become apparent upon a study of the following specification and drawing wherein:

Figure 1 is an elevation view of the present shutter construction, with parts being broken away to conserve space.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Figure 5 is a sectional view taken on the line 5—5 of Figure 1.

Figure 6 is a sectional view taken on the line 6—6 of Figure 1.

Figure 7 is a sectional view taken on the line 7—7 of Figure 1.

In Figure 1, shutter 10 comprises a frame having an upper horizontal member 11, an intermediate horizontal member 12, a lower horizontal member 13, a left hand vertical member 14, and a right hand vertical member 15. Member 11 is constructed of an angle member 18, having a flange 19 extending transversely of the central plane of the shutter and a flange 20 extending parallel to said plane, and a second angle member 22 having similar flanges 23 is arranged along the bottom side of flange 19 with the edges of flanges 23 welded thereto, as best shown in Figures 2 and 3 and with the angle edge of member 22 extending toward the center of the shutter. Frame member 13 is constructed the same as frame member 11, with flange 25 of member 26 extending parallel to 19 and flange 27 of member 26 parallel to flange 20. Member 31 is arranged on top of flange 25 with its flanges 32 being welded to flange 25 and with its crest or angle portion extending upwardly toward the center of the shutter.

Intermediate frame member 12 is formed of two similar angle members 35 and 36 having their flanges 37 and 38, respectively, joined by welding, members 35 and 36 preferably being similar to members 22 and 31. Member 12 is arranged with the angle portion of members 35 and 36 in the same central plane as the angle portions of members 22 and 31.

Side frame member 14 comprises an angle member having a flange 42 transverse to the plane of the shutter and a flange 43 parallel to flanges 20 and 27, member 14 being attached to members 11, 12 and 13 in any suitable fashion but preferably by welding. A small angle member 44, extending from member 22 to member 31, and interrupted by member 12, is attached to flange 42 and serves both as a stop and a sealing member for the adjacent shutter blade. Side frame member 15 is similar to 14 and comprises a flange 46 extending parallel to flange 42 and a flange 47 parallel to flanges 20, 27 and 43, member 15 also being joined to members 11, 12 and 13 by welding. A small angle member 48, similar to 44, is attached to flange 46 and likewise serves as both a stop and a sealing member, it being noted that this member is on the opposite side of the aforementioned central plane because it is on the opposite side of a shutter blade pivot, as will appear.

Either before or after the construction of horizontal members 11, 12 and 13, holes are bored or punched to receive the axles and bushings for the shutter blades, each set of holes being in alignment with the axle or axles of a blade assembly. Further, the holes through members 22, 31, 35, and 36 are centered with the angle portion or crest of each of these members, as is apparent in Figures 2 and 6. While only boring is feasible for obtaining the holes after the horizontal members are assembled, either boring or punching is satisfactory before said members are built up. In addition to providing the necessary holes in the frame members, cylindrical self-lubricating bushings 51, each having a flange 52, are arranged in members 11 and 13 so that the cylindrical part extends and fits snugly into the holes provided in flanges 19 and 25 and the flanges 52 are clamped between flanges 23 and 19 and 32 and 25 of members 11 and 13, respectively. Spacer sleeves 54, thrust washers 55 and sleeve bushings 56 are put in place during the assembly of the shutter blades and their axles.

Each shutter blade 58 comprises a first or outside portion 59 and a second or inside portion 60 offset from the portion 59 by a right angles offset portion 61. Portion 59 terminates in an in-turned flange 62 and portion 60 terminates in an out-turned flange 63, these flanges extending inwardly and outwardly, respectively, by the amount of off-set less the thickness of the blade material. Blades 58 are assembled in frame 10 by inserting stub axles 66 into bushings 51 and inserting axle 67 through sleeve bushings 56, located in member 12, followed by slipping sleeve 54 and washers 55 over axles 66 and washers 55 over axles 67, whereupon blades 58 are positioned so that the axles fit within the angle formed by offset portion 61 and blade portion 59, the blades then being riveted or otherwise secured to the axles. Care is taken that each blade assembly comprising two blades connected by an axle 67 is aligned so that all blade parts are parallel and each blade assembly is arranged so that the blades may simultaneously pivot in the same direction. Preferably, the blades are arranged in overlapping relation so that both flanges 62 and 63 may engage its respective adjacent blade and thereby provide a double seal between the blades, as shown in Figures 1 and 6. A bracket 69 is attached to each blade and each bracket is pivotally connected to an operating bar 70, shown only in part, so that the blades may be simultaneously operated. As axles 66 and 67 have a diameter substantially equal to the dimensions of offset 61, portions 59 and 60 are located equidistant from the angle portion or crest of members 22, 35, 36 and 31 but on opposite sides thereof.

Each blade portion 59 and 60 is made long enough to engage, or approximately engage, its adjacent sloping frame surface 23, 37, 38, or 32, as best shown in Figures 3, 4 and 5. Because a part of each of flanges 62 and 63 extend past the aforementioned angle portion or crest when the blades are closed, these flanges must be trimmed to clear the angle portion, as shown by 72 and 73, and the portion of each of the flanges between its trimmed portion and its adjacent blade portion is cut to fit the adjacent angle surface, as shown by numerals 74 and 75, in Figures 3 and 4. Obviously, each blade is also cut to clear the projecting portions of bushings 54 and 56 and washers 55.

While members 11, 12 and 13 are shown to be constructed of standard angle members, it is apparent that other shapes may be used equally well providing that sufficient space be provided in the hollow members for clamping the flanges 52 of the bushings 51 and that at least the upwardly facing frame members adjacent the shutter blades have suitably inclined or curved faces to facilitate drainage of water and that there are no flat surfaces adjacent the blades on which ice might accumulate and interfere with the operation of the blades. Because of the sloping faces adjacent the top and bottom edges of the blades, any ice that does form is easily broken because only the ice at the engaging edges need be broken and there are no large areas of ice to be broken by shear forces, as with the known prior art shutters.

As previously mentioned, the blades are all connected together by an operating bar 70 so that, by reciprocating the bar, each of the blades pivots about its axles and portions 59 and 60 removing away from their respective frame surfaces and flanges 62 and 63 moving away from their adjacent blade surfaces.

As a study of the present disclosure will reveal many substitutions and equivalents, the scope of this invention should be determined only by the appended claims.

I claim as my invention:

1. A shutter including a peripheral frame having horizontal and vertical members and also including an intermediate horizontal member and a plurality of blade members pivotally mounted in said frame between said horizontal members, each of said horizontal frame members including a member having a crest and sloping faces for engagement by said blade members when they are in a closed position, axle means for each of said blades, said axle means being arranged near the middle of each of said blade members so that the blade portions on each side of said axle means are substantially equal in extent, an offset in each of said blade members between said areas adjacent said axle means, and bearing means pivotally mounting said axle means in said frame, said bearing means being located in alignment with the crests of said members having sloping faces so that the offset blade portions straddle said members and said portions tend to engage the opposite sloping sides of said members, the outer edges of each blade members being formed and cut to extend over the crests of said members by an extent equal to the offset less the thickness of the adjacent blade.

2. A shutter having a peripheral frame with horizontal and vertical members and having a plurality of vertically arranged blade members pivotally mounted in said horizontal members, at least the lower of said horizontal members having an uppermost edge and an outwardly sloping face extending downwardly therefrom against which the lower edges of said blades are adapted to close to thereby facilitate drainage of water at the line of engagement of the blades with the sloping face, the lower edges of said blades thus extending below the uppermost edge of said lower horizontal member.

3. A shutter having a peripheral frame with horizontal and vertical members and having a plurality of vertically arranged blade members pivotally mounted in said horizontal members, each of said horizontal frame members being hollow and built up of a pair of members one of which has a generally convex shape directed toward said blade members, spaced openings along the edges of said convex shapes directed toward said blade members, flanged bearing members arranged in said hollow frame members with a portion of each of said bearing members extending into each of said spaced openings, axle means attached to and extending longitudinally of said blades, said blades being offset approximately the diameter of said axles, said axles being located adjacent the offset portion of each of said blades and near the mid point of said blades, the offset portions of each of said blades tending to straddle its adjacent convex member in such manner that the portion of each of said blades on one side of the axle tends to close against one side of said adjacent convex member and the portion of each blade on the other side of the axle tends to close against an opposite side of said adjacent convex member.

4. A shutter comprising a frame and a plurality of pivoted blades, said frame comprising a pair of longitudinally extending members attached together along their longitudinally extending edges to form an elongated hollow frame member, a plurality of aligned holes extending through at least one of said members, a plurality of flanged hollow bearing members each having a portion extending into one of said holes, the flanges of each of said bearing members being clamped between and by said pair of frame members, and an axle for each of said blades journaled in its respective hollow bearing member.

5. A shutter frame comprising a pair of elongated members, one of said members having a generally channel shaped cross section, means joining said members together, said members being arranged to form an elongated hollow frame member, a plurality of holes in one of said members transverse to the longitudinal axis of said member, flanged cylindrical bearing members for each of said holes arranged in said hollow frame member with the cylindrical portion of each bearing member extending into its respective hole and with its flange clamped by and between said frame members.

6. A shutter frame comprising a longitudinally extending outer angle member having one flange arranged at right angles to the face of said shutter, a second longitudinally extending member having substantially symmetrical flanges arranged with the edges of its flanges attached to said one flange of said angle member and with the crest of said second member extending toward the center of the shutter frame, openings through said second member, said openings being aligned with the crest of said second member, and a flanged hollow bearing member for each opening held in place between said members, the flanges of said bearing members being clamped by and between said frame members and the hollow portion of each of said bearing members aligning with its respective opening.

7. A shutter frame comprising a pair of longitudinally extending structural angle members secured together to form a hollow frame member, a series of openings through at least one of said structural members, said openings being aligned with the angle portion of said one member and extending transversely to the axis of said hollow frame member, and a bearing member for each of said openings, said bearing members each having a flange clamped by and between the flanges of said angle members and a portion of each of said bearing members extending into its respective opening.

8. A shutter construction including a peripheral frame with horizontal and vertical members and having a plurality of vertically arranged blade members pivotally mounted in said horizontal members, at least the lower of said horizontal members having an uppermost edge and having an outwardly and downwardly inclined surface against which said blades are adapted to close in line engagement, the inclined surface facilitating drainage of water and minimizing the forming of ice between the blades and the inclined surface, said line engagement being below said uppermost edge.

9. A shutter including a peripheral frame having horizontal and vertical members and also including an intermediate horizontal member and a plurality of blade members pivotally mounted in said frame between said horizontal members, each of said horizontal frame members including a member having a crest and sloping surfaces for engagement by said blade members when they are in a closed position, axle means for each of said blades, said axle means being arranged near the middle of each of said blade members so that the blade portions on each side of the axle means are substantially equal in extent, an offset in each of said blade members between said areas adjacent said axle means, and bearing means pivotally mounting said axle means in said frame, said bearing means being located in alignment with the crest of said members having sloping faces so that the offset blade portions straddle said members and said portions tend to engage the opposite sloping surfaces of said members, the outer edges of each of said blade members being formed and cut to extend over the crest of said members by an extent equal to the offset less the thickness of the adjacent blade, the axles for the adjacent blades being located near enough together so that the edges of the blades overlap in such manner that the formed edge of each blade engages the adjacent blade when the blades are in a closed position, thereby forming a double seal between the blades.

10. A shutter construction including a peripheral frame with horizontal and vertical members and having a plurality of vertically arranged blade members pivotally mounted in said horizontal members, said horizontal members having inwardly directed edges and having outwardly inclined surfaces extending therefrom against which said blades are adapted to close in line contact, the inclined surfaces cooperating with said vertical blades to provide a reasonably tight seal against air flow and to provide a tortuous path for air that does leak by the blades, said line contact being outwardly from said inwardly directed edges.

References Cited in the file of this patent

UNITED STATES PATENTS

| | | |
|---|---|---|
| Re. 17,277 | Messenger | Apr. 23, 1929 |
| 116,679 | Brock | July 4, 1871 |
| 306,816 | Eckstein | Oct. 21, 1884 |
| 1,091,844 | Holland | Mar. 31, 1914 |
| 1,540,280 | Raleigh | June 2, 1925 |
| 1,598,152 | Reichardt | Aug. 31, 1926 |
| 1,628,858 | Shawk | May 17, 1927 |
| 1,871,685 | Goldfisher | Aug. 16, 1932 |
| 1,876,017 | Petersen | Sept. 6, 1932 |
| 1,884,195 | Petersen | Oct. 25, 1932 |
| 2,026,653 | Raleigh | Jan. 7, 1936 |
| 2,220,405 | Jones | Nov. 5, 1940 |
| 2,359,289 | Brown | Oct. 3, 1944 |
| 2,499,692 | Spratt | Mar. 7, 1950 |
| 2,554,822 | Geier | May 29, 1951 |
| 2,607,452 | Hall | Aug. 19, 1952 |

FOREIGN PATENTS

| | | |
|---|---|---|
| 360,051 | Germany | Sept. 29, 1922 |